Sept. 17, 1935. A. GOOD Re. 19,704
SLUG CASTING TYPESETTING MACHINE OPERATION
Original Filed July 14, 1928
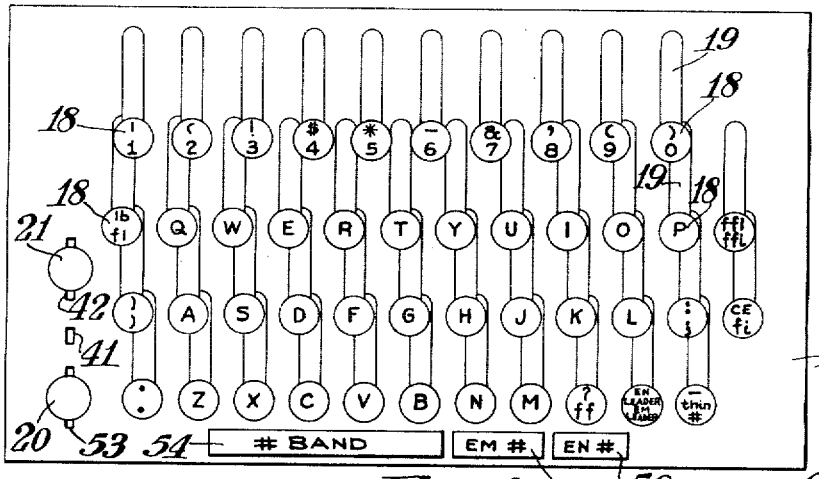
Fig. 1
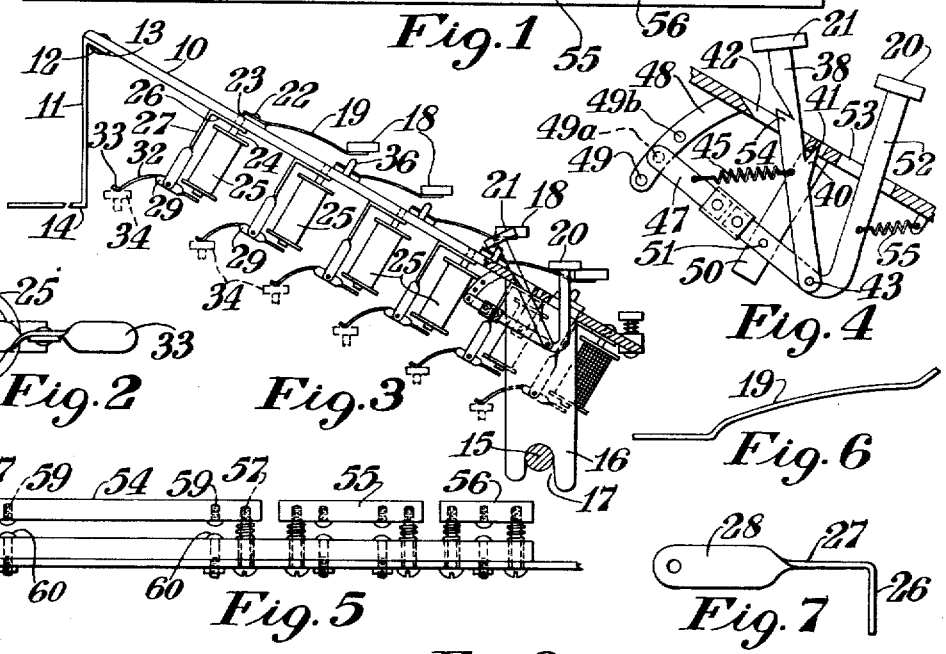
Fig. 2
Fig. 3
Fig. 4
Fig. 6
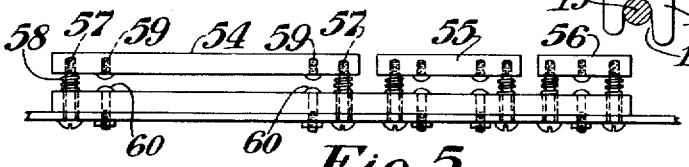
Fig. 5
Fig. 7
Fig. 9
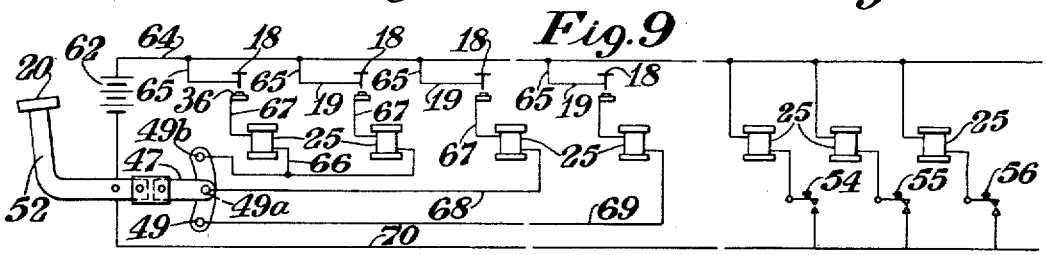
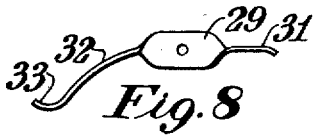
Fig. 8
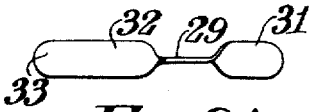
Fig. 8A
INVENTOR
ANDREW GOOD
BY D. Clyde Jones
ATTORNEY Reissued Sept. 17, 1935

Re. 19,704

UNITED STATES PATENT OFFICE 19,704

SLUG-CASTING TYPESETTING MACHINE OPERATION

Andrew Good, Fullerton, Calif., assignor, by direct and mesne assignments, to American Type-O-Writer Co., Ltd.

Original No. 1,795,854, dated March 10, 1931, Serial No. 292,622, July 14, 1928. Application for reissue May 2, 1932, Serial No. 608,844

16 Claims. (Cl. 199—18)

This invention relates to improvements in slug-casting typesetting machines and more particularly to means for operating the keys thereof, and has for its object to provide a simple, efficient and inexpensive device of this character.

Another object of this invention is to provide improved mechanism in a slug-casting typesetting machine for replacing the conventional key-board thereof by means of a standard typewriter key-board.

Another object of this invention is to provide means in a slug-casting typesetting machine for adapting the present keys thereof to a standard typewriter arrangement of keys.

A further object of this invention is to provide a key-board as an auxiliary or supplemental attachment to the present style of slug-casting typesetting machine keyboard for the purpose of dispensing with special skill in the operation of such machines.

A further object of this invention is to provide means for removably mounting the auxiliary key-board upon the key-board of a conventional slug-casting typesetting machine.

A still further object of this invention is to provide mechanism electromagnetically controlled for manually operating the keys of a standard slug-casting typesetting machine thru the medium of auxiliary keys.

Another object of this invention is to provide an auxiliary keyboard equipped with operating keys and shift keys and operating means actuated thereby for selectively operating the keys of a line-casting typesetting machine.

Another object of this invention is to provide mechanical key-pushers for operating the keys of the slug-casting typesetting machine, said key pushers being electrically controlled.

With the above and other objects in view my invention consists in, the combination, arrangement and details of construction disclosed in the drawing and specification and then more particularly pointed out in the appended claims.

In the drawing, wherein similar reference characters designate similar parts throughout the respective views, Figure 1 is a plan view of the key-board.

Fig. 2 is a bottom plan view of a magnet together with a depressor operated thereby, Figure 3 is a side elevation of my invention, Figure 4 is a sectional fragmental detail view showing the shift key arrangement, Figure 5 is a side elevation of the spacer keys, Figure 6 is a side view of the spring arm, Figure 7 is a side view of a supporting arm, Figure 8 is a side elevation of a key pusher, Fig. 8*a* is a plan view of a key depressor;

Figure 9 is a diagrammatic view of the circuit arrangement.

Referring to the drawing which is merely illustrative of my invention a base board or key board is designated 10 being inclined when applied upon the key-board of a slug-casting typesetting machine. One of the supports 11 for this key-board is shown in Figure 3, and the angular lug 13 thereof is secured by rivets 12 to the base board 10 by reason of which the vertically disposed support 11 holds the base board in inclined position, the lower right angular portion 14 of this support resting on a part of the slug-casting typesetting machine.

Two vertically disposed props 16 are attached to the other end of the baseboard 10 at each side thereof. The lower ends of these props are respectively formed with the recesses 17 to engage the assembling elevator lift rod 15 of the slug-casting typesetting machine, so that this rod serves to support the lower front part of the baseboard 10.

In this manner the frame or baseboard 10 is caused to be supported in superimposed position directly over the keyboard of the slug-casting typesetting machine, the keys of the latter being designated 34. With the baseboard 10 disposed and mounted in this manner it will be seen that same can be removed at any time. It may be understood that slug-casting typesetting machines will be built so as to eliminate the former keyboards found on them in favor of the improved key-board forming the subject-matter of this invention.

A plurality of keys 18 are provided for depressible action upon the key board or base board 10, and these keys follow the exact order and disposition of the usual keys of the standard types of typewriters so that typists accustomed to handling and operating typewriters or the like can operate slug-casting typesetting machines by depressing the keys 18 according to the same touch method as is used in the operation of the usual typewriter keys, the concordance between the slug-casting typesetting and standard typewriters being brought about by my invention. The keys 18 are securely mounted upon the extreme outer ends of leaf spring arms 19 which are secured at their inner ends by fasteners 22 to the blocks 23 which are or may be insulator blocks. The shape and arrangement of the spring arms 19 is such that they normally support the keys in a horizontal plane.

Besides the keys 18 devoted to the usual letters and numbers and punctuation marks shown in Figure 1 there is the usual typewriter shift key lever having the key 20 and the latching key 21 therefor. A series of electromagnets 25 is provided of which one magnet is related to each key of the series of keys on the machine keyboard. Each magnet is supported on the underside of the board 10 by a fastener 24 secured into this board. Each fastener also secures the right angular portion 26 of a hanger 27 to the underside of the keyboard so that each hanger is rigidly supported in parallel relation to the principal axis of its associated electromagnet. The lower portion 28 of each hanger serves as a fulcrum bearing for a key pusher or a depressor 29, pivotally mounted thereon intermediate of its ends, which depressor consists of the armature 31 normally positioned in operative relation to its individual magnet 25 and the downwardly curved metal finger 32 terminating in a curved key engaging toe 33. The toe 33 of each depressor 29 may if desired, rest upon the adjacent key 34 of the slug-casting typesetting machine which it is designed to operate. The magnets are thus secured insulatedly to hang from the base board 10 so that when the baseboard is removed the magnets and other parts of my invention are removed as one unit.

The shift key arrangement is described as follows. The shift key 20 is secured upon the vertically disposed arm 52 of a bell crank lever which is pivotally supported at 51 on an extension 50 of the frame. The other arm 47 of this lever is designed to swing into electrical engagement with any one of a number of contacts, for example, one of the three contacts 49, 49*a* and 49*b*. These contacts are mounted upon the arcuate shaped piece of insulation 48 which is secured upon the underside of the board 10. There is pivoted at 43 on the arm 47 of the bell crank lever, a push rod or bar 38 carrying the latching key 21. This bar 38 is provided at one side with a hook 40 to engage the slot 41 in the baseboard 10 and is also provided at its other side with a hook 54 to engage the edge of slot 42 in this board so that the arm 47 can be latched respectively in engagement with the contacts 49*a* or 49*b*. A suitable tension spring 45 connects the bar 48 and the arm 47 so that the hooks 40 and 54 can latch the shift key mechanism in the positions to which it has been adjusted.

The spacer depressible key is designated 54, and alongside the same is the em spacer 55, and alongside the latter is the en spacer key 56. These three keys are all in alinement and determine the operation of the proper em or en spaces or of the space band of the slug-casting typesetting machine. At each end of each of these spacer members is a screw pin 57 tapped into this member and also secured in the lower base board; alongside of this screw pin is another pin screwed into the member 54 as at 59, while a contact pin 60 in alinement therewith is secured into the base board 10. As spring 58 is coiled around pin 57 which holds the spacer member spaced from the base board requiring depression of this spacer member before the spring is tensioned, which spring of course restores the spacer member to normal position when pressure is removed from the spacer member.

The electrical circuit includes a magnet for each key in the series of slug-casting typesetting machine keys; a switch for closing the circuit to the magnet, and a pusher or equivalent device for releasing the matrices. Referring to Fig. 9, it will be seen that a battery or other source of electric current 62 is employed and from one side of this source there extends a wire 64 from which wires 65 included in branch circuits, lead to the respective keys 18 and when one of the keys 18 is depressed, a branch circuit is completed through its related contact 36, conductor 67, winding of magnet 25, conductors 66, 68 or 69, switch arm 47 to the other side of the current source. It will be understood that each of these branch circuits is normally opened at its key 18 and its contact 36, but by selectively depressing these keys, either alone or in combination with the shift key and locking key mechanism 20 and 21, branch circuits are selectively completed for operating the control magnets 25 and in turn the key pushers or other matrix releasing parts of the slug-casting typesetting machine. Each spacer key 54, 55 or 56 likewise completes a circuit for its related magnet 25, each circuit including the current source 62 and conductors 64 and 70. Only a few of the necessary magnets have been illustrated and this fact is indicated by the breaks occurring in the conductors 64, 69 and 70.

In operation the operator familiar with the use and operation of any standard typewriter, depresses the keys 18 for the lower case, or shift keys 21, 20 and keys 18 for the large caps, or for the small caps and in this manner will cause the matrices of the slug-casting typesetting machine to be operated selectively and interchangeably as called for by the characters of the text. In depressing any particular key 18 this key flexes the spring arm 19 sufficiently to make the key 18 and its individual contact 36 interengage; so that the circuit is closed from the current source 62 to the particular magnet associated with this key. Thereupon this magnet becomes energized and draws to itself the armature end 31 of the particular pusher 29, and in drawing this end of the lever inward, the curved toe 33 is depressed, thereby depressing the appropriate slug-casting typesetting key 34 and operating the proper matrix to cast the proper character printed on the key depressed in the first place. In this connection it will be noted that the magnet may control the operation of any device designed to operate the proper matrices whether keys 34 be used or not. When the spacer members 54, 55 and 56 are operated, the particular size of space required is provided for in the line cast on the slug. Likewise when shift key 20 is depressed, it moves the lever 52 downward against the tension of spring 55 which is secured to board 10 at one end and to lever 52 at the other end. This lever in turn tends to draw the latching bar 38 downward so that its hook 40 can under the tension of the spring 45 engage the slot 41 in the board 10, or hook 54 can engage the edge of slot 42 thereby locking the lever 52 in adjusted position until lever 38 is disengaged again by key 21 to release the shift key 20.

I do not limit myself to the exact details of construction disclosed herein but claim all variations falling within the purview of the claims in a slug casting machine.

There are 90 keys on a Linotype or Intertype machine and their arrangement is cumbersome and intricate. Many of the keys bear characters which are repeated on other keys as occasion may warrant, as where the text calls for a character say "A" small caps, large caps or lower case, as the case may be. These frequent repetitions make the slug-casting typesetting machine keyboard unwieldy, unduly large for quick action performed on the keys, and slacken the speed of the operator. Such a keyboard calls into requisition the left side of the machine more than the right.

The present invention contemplates the use of fewer than 90 keys, as each key bears a different character, whereas in the slug-casting typesetting the various characters are repeated three times. However each of certain keys 18 of the keyboard of this invention controls three magnets 25, for large cap, small cap, and lower case type requirements. Hence there will be as many magnets as there are separate slug-casting typesetting machine keys. Each magnet of the sets of magnets controlled by each particular key 18 is designed to be cut in and out of the electrical circuit by the operation of the shift key and lock 20, 21. Thus normally the arm 47 rests with its contact point 49 on the arcuate piece 48. One set of magnets 25 are now in circuit with the current source, the wire from each of these magnets running to one side of the current source by way of arm 47. These magnets operate the matrices for lower case. For large caps the key 20 is depressed, to shift arm 47 with its contact point into engagement with the contact 49a on the arcuate piece 48 as shown in Figure 9. The first set of magnets have now been cut out of the circuit and a new set of magnets cut into the circuit, wires from those magnets returning to one side of the current source by way of arm 47. For small caps, key 20 is again depressed to place arm 47 in engagement with contact 49b on arcuate piece 48 so that now the second set of magnets has been cut out and a third set of magnets cut into the circuit also having return electrical connections by way of arm 47 to one side of the current source. The arm 47 will always close the circuit to one magnet of any set of magnets when the proper key 18 is depressed. In this way the entire range of 90 keys of the slug composing machine may be operated by means of fewer keys.

In this application and disclosure, it should be borne in mind that in any Linotype machine, Intertype or Linograph in use today the keys thereon are multiplied at great length and bear no relationship in order and arrangement to the keys of the standard typewriter. In any such slug-casting typesetting machine many years of practice are required before a slug-casting typesetting operator attains a proficient rate of speed, whereas typists on standard typewriters attain very great speeds at the expenditure of a fraction of the time and nervous energy consumed by the slug-casting typesetting operator. My invention brings about great simplification and facilitation in the setting of small capitals on the typesetting machine by providing a shift key to permit the operation of small capitals from the same keyboard as the one used for lower case and capital letters. This works an innovation in the operation of slug-casting typesetting machines. Thus any typist accustomed to speedily operating the standard typewriter may operate the slug-casting typesetting machine without previous study or practice and with very little diminution of speed. It is intended to construct the novel key board in a slug casting machine to replace the key-board now found on such machines and this may be done even by dispensing with keys at all so long as it is possible to selectively and manually control the operation and intervals of activity of the particular matrices which will form the characters desired on the slugs cast. Instead of having to reach far out as on present makes of typesetting machines to depress desired keys the novel keyboard becomes the real key-board of an existing typesetting machine and reduces to small compass the size of the key-board.

What I desire to claim and secure by Letters Patent is:—

1. An auxiliary Linotype key-board comprising a plurality of spring supported keys, a plurality of magnets associated in staggered relation with said keys, of the main Linotype keyboard, an electrical circuit in which said magnets are included, switches controlled by said spring-supported keys, and pivotal pushers controlled by said magnets selectively, for depressing the Linotype keys.

2. A device as described consisting of a key board removably attachable over the keys of a Linotype machine, a series of spring arms secured upon said keyboard, keys carried yieldably and terminally by said spring arms, an electrical circuit, magnets severally connected to said electrical circuit, contacts for closing said circuit engaged by the several keys selectively, said magnets being selectively energized by the engagement of key and contact, and means normally resting upon the keys of the Linotype machine and separately controlled by said magnets for operating the Linotype keys.

3. Mechanism for operating Linotype machines in standard typewriter fashion consisting of an auxiliary key-board surmounting the Linotype keys, means attaching said keyboard upon a Linotype over the keys of the latter, Linotype key depressors normally resting upon the Linotype keys, magnets interposed between said depressors and the keys of the auxiliary keyboard for energizing said magnets to selectively control the latter, and circuit closing devices for energizing said magnets controlled by said auxiliary board keys selectively.

4. An auxiliary key board for Linotype machines consisting of a base, a plurality of depressible keys and shift keys arranged in standard typewriter order, springs opposing the depression of said keys, selectively a group of magnets, one associated with each key, means controlled by said keys selectively for energizing said magnets and lever-shaped pushers associated with said magnets having armatures attracted by said magnets and Linotype key engaging parts to depress the latter.

5. In a device as described the combination of a frame, an arcuate shaped plate, contact pins arranged on said plate having electrical connections to a circuit, a bell crank lever having one arm pivoted so as to sweep across said contact pins selectively, magnets controlled by the several contact pins when contacted, a key board having keys for depressing said lever, a depending arm on said frame on which said lever is pivoted, a shaft lever pivoted on the mentioned lever arm depressible from above the said key-board and having an intermediate hook, a spring connecting both levers, a key board on the shift lever and a slotted plate fixedly mounted in the slot in which said hook is constrained to engage.

6. In combination with a base board, a series of magnets dependingly carried thereby, a series of individual detents pivoted fixedly so as to be attracted movably by said magnets selectively, key-pushers pivotally carried by said detents designed to rest upon Linotype keys, a standard typewriter set of keys arranged in surmounted relation depressingly upon said base-board, and electrical means actuated by said last set of keys selectively for energizing said magnets selectively.

7. In combination with the keys of a slug-casting typesetting machine, an auxiliary keyboard supported over the keys of said machine and employing a lesser number of keys than those of the machine, elements carried by the auxiliary keyboard superposed over all of the machine keys for operating them, and means actuated interchangeably by the keys of the auxiliary keyboard for actuating all of said elements.

8. In combination with the large capital, the small capital and lower case keys of a slug-casting typesetting machine, a standard typewriter assembly of keys superposed thereon including the conventional shift key mechanism for large capital letter key operation, means selectively actuated by the assembly of keys individually for synchronously operating the corresponding keys of the slug casting typesetting machine, and shift-key controlled means included in said assembly for employing the same typewriter keys to operate selectively the small capital keys of the slug-casting typesetting machine.

9. In a slug-casting typesetting machine, the combination with the 90 keys thereof, arranged in groups for large caps, small caps and lower case type requirements, a standard typewriter keyboard arranged in superposed relation upon the said 90 keys, and 90 devices controlled by the keys of said standard keyboard for actuating said 90 keys selectively, some of said keys of the standard keyboard having shift keys for controlling the small cap and lower case group of said machine keys.

10. In combination with the usual keys in a keyboard of a slug-casting typesetting machine, electrically actuated means for selectively depressing all of the keys of said keyboard, an auxiliary keyboard unit superimposed on said machine keyboard and provided with key-shifting means and with keys arranged according to the arrangement of keys in a standard typewriter keyboard, and circuits for said electrical means jointly controlled by said auxiliary keyboard keys and by said key-shifting means.

11. In combination with the keys of a slug-casting typesetting machine, an auxiliary keyboard mounted adjacent the keys of said typesetting machine and employing a lesser number of keys than those of said typesetting machine, elements mounted in the auxiliary keyboard and superimposed over all of the typesetting machine keys for operating them, and means actuated selectively by the keys of the auxiliary keyboard for selectively actuating all of said elements.

12. In combination with a slug-casting typesetting machine having ninety keys for establishing different type combinations of lower case, small capital and large capital letters, an auxiliary keyboard unit having less than ninety keys therein, said auxiliary keyboard unit being superimposed over said first-mentioned keys, and means actuated by the keys of said auxiliary keyboard unit for selectively operating all of said ninety first mentioned keys.

13. In combination with the keys of the keyboard of a slug-casting typesetting machine electrical means for selectively depressing all of the keys of said keyboard unit superimposed over said first-mentioned keyboard, said auxiliary keyboard unit, an auxiliary keyboard having its keys arranged according to the arrangement in the keys of a standard typewriter keyboard, key shift mechanism associated with said auxiliary keyboard unit, and circuits selectively completed by the operation of the respective keys of said auxiliary keyboard unit and by said shift key mechanism for selectively actuating all of said electrical means.

14. In combination with a slug-casting typesetting machine having the usual operating keys and an assembly elevator lift rod, an auxiliary keyboard having therein a lesser number of keys than the number of the first mentioned keys, said auxiliary keyboard being supported on said machine in engagement with the lift rod, and means for operating said first mentioned keys from the keys of said auxiliary keyboard.

15. In combination with a slug-casting typesetting machine provided with three different series of alphabet keys, an auxiliary keyboard unit superimposed over said alphabet keys in operative relation thereto, said keyboard unit having a single series of alphabet keys, and means including a key in said auxiliary keyboard unit for selectively operating a key in each of said first-mentioned series of keys.

16. In combination with a machine having three different series of alphabet keys, an auxiliary keyboard unit superimposed on said alphabet keys in operative relation thereto, said keyboard unit being provided with a single series of alphabet keys and key shift mechanism, and means including a key in said auxiliary keyboard unit and said key shift mechanism for selectively operating a key in each of said first mentioned series of keys.

ANDREW GOOD.

CERTIFICATE OF CORRECTION.

Reissue No. 19,704. September 17, 1935.

ANDREW GOOD.

It is hereby certified that error appears in the printed specification of the above numbered patent requiring correction as follows: Page 4, second column, line 15, claim 13, after "machine" insert a comma; line 17, claim 13, beginning with the word "unit" strike out all to and including "unit" in line 19, and insert the same after "keyboard" in same line 19; and that the said Letters Patent should be read with these corrections therein that the same may conform to the record of the case in the Patent Office.

Signed and sealed this 14th day of January, A. D. 1936.

Leslie Frazer (Seal) Acting Commissioner of Patents.